US012251958B1

(12) United States Patent
Li

(10) Patent No.: US 12,251,958 B1
(45) Date of Patent: Mar. 18, 2025

(54) BINDER CAPABLE OF TURNING PAPER BY 360 DEGREES

(71) Applicant: Zuling Li, Shenzhen (CN)

(72) Inventor: Zuling Li, Shenzhen (CN)

( * ) Notice: Subject to any disclaimer, the term of this patent is extended or adjusted under 35 U.S.C. 154(b) by 0 days.

(21) Appl. No.: 18/387,866

(22) Filed: Nov. 8, 2023

(51) Int. Cl.
*B42F 13/26* (2006.01)

(52) U.S. Cl.
CPC .................................... *B42F 13/26* (2013.01)

(58) Field of Classification Search
CPC ....................................................... B42F 13/26
USPC .............................. 402/4, 26, 31, 36, 37, 46
See application file for complete search history.

(56) References Cited

U.S. PATENT DOCUMENTS

2004/0170468 A1* 9/2004 Chizmar ............. B42F 13/0006 402/42

* cited by examiner

*Primary Examiner* — Justin V Lewis
(74) *Attorney, Agent, or Firm* — Jose Cherson Weissbrot

(57) ABSTRACT

A binder capable of turning paper by 360 degrees comprises a main body and at least one retaining ring, the main body has a length and a width extending along the axial direction, the main body defines a main body plane along the length and the direction of the width; the retaining rings are distributed along the length and form a fixed connection with the main body; it comprises base points, which extend away from the main body plane to form an upper free end and a fixed end; after extending a width distance in the direction of the width, the fixed end continues to extend away from the upper free end and form a lower free end; the upper free end and the lower free end extend and joined away from the main body, so that the retaining ring has a path for the paper to turn 360 degrees.

17 Claims, 18 Drawing Sheets

BINDER CAPABLE OF TURNING PAPER BY 360 DEGREES

TECHNICAL FELD

The present invention relates to the technical field of stationery, in particular to a binder capable of turning paper by 360 degrees.

BACKGROUND

Binder is a very common tool in daily life. Binder is usually used to hold loose files, which can be easily stored or taken out. Binder can be reused for subsequent storage of other files. Binder has a ring inside for firmly holding loose files. However, the files stored in the traditional binder can only be turned 180 degrees, which will occupy a large space when used, and the traditional binder itself is bulky and inconvenient to carry.

U.S. patent Ser. No. 05/846,447 provides a binder assembly that is durable and easy to operate. The binder includes an integral trunk made of elastic plastic material, and a plurality of pairs of matched clamping rings are mounted on the trunk. However, the design of this clamping ring may be bent or damaged during use, and the binder can only be turned 180 degrees.

U.S. patent Ser. No. 08/806,056 provides a ring binder for fixing perforated paper and the like, which includes an annular metal. The annular metal is composed of a pair of blades, and the blades can move relatively. This design may require more force when opening and closing, and it is not simple and convenient to use.

U.S. patent Ser. No. 09/061,940 provides a paper binder with strong bearing capacity. This binder is a paper binding device, which controls the binder to open or close through a single device to store paper, but it is not flexible and convenient in the process of use and carrying.

Based on the above problems, it is necessary to put forward a brand-new binder, which can make the turning angle of files larger and more convenient for reading and writing. At the same time, through the unique retaining ring design, it makes the storage and arrangement of files simpler and more efficient, making the work simpler and more efficient, and further improving the experience.

SUMMARY

The present invention provides a binder capable of turning paper by 360 degrees, which includes a main body and at least one retaining ring,

- wherein, the main body has a length and a width extending along an axial direction, the main body defines a main body plane along directions of the length and the width, and the retaining rings are evenly distributed on the length; and
- wherein, the retaining ring is fixedly connected with the main body, and comprises an upper base point and a lower base point which are oppositely arranged along the direction of the width; wherein after extending a dimension height below the main body plane, and the lower base point continues to extend a dimension width away from the main body; wherein the dimensions of the dimension height and the dimension width are not less than a distance between a paper edge and a paper perforation; and
- the upper base point extends above the main body plane and engages with the free end of the lower base point far away from the main body, so that the retaining ring has a path for paper to turn 360 degrees.

The present invention also provides a binder capable of turning the paper by 360 degrees, which includes a main body and at least one retaining ring,

- wherein, the main body has a length and a width extending along an axial direction, the main body defines a main body plane along direction of the length and the width, and the retaining rings are evenly distributed on the length;
- wherein, the retaining ring is fixedly connected with the main body, and comprises an upper base point and a lower base point which are oppositely arranged along the direction of the width, wherein the lower base point extends below the main body plane and the upper base point extends above the main body plane, wherein the upper base point extends above the main body plane and is engaged with the free end of the lower base point far away from the main body, so that the retaining ring has a path for paper to turn 360 degrees.

The present invention also provides a binder capable of turning the paper by 360 degrees, which includes a main body and at least one retaining ring,

- wherein, the main body has a length and a width extending along an axial direction, the main body defines a main body plane along direction of the length and the width, and the retaining rings are evenly distributed on the length;
- wherein, the retaining ring forms a fixed connection with the main body, including a base point, wherein the base point extends away from the main body plane to form an upper free end and a fixed end, wherein after extending a width distance in the width direction, the fixed end continues to extend away from the upper free end to form a lower free end, wherein the width distance is not greater than a width of the main body;
- the upper free end and the lower free end continue to extend and are joined away from the main body, so that the retaining ring has a path for paper to turn over degrees.

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the detailed description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

BRIEF DESCRIPTION OF DRAWINGS

In order to explain the technical solution of this application more clearly, the drawings needed in the implementation will be briefly introduced below. Obviously, the drawings described below are only some implementations of this application. For those skilled in the art, other drawings can be obtained according to these drawings without creative work.

FIG. 71 is a schematic diagram of a paddle in the application of the present invention;

In the figures:

Figure 1:
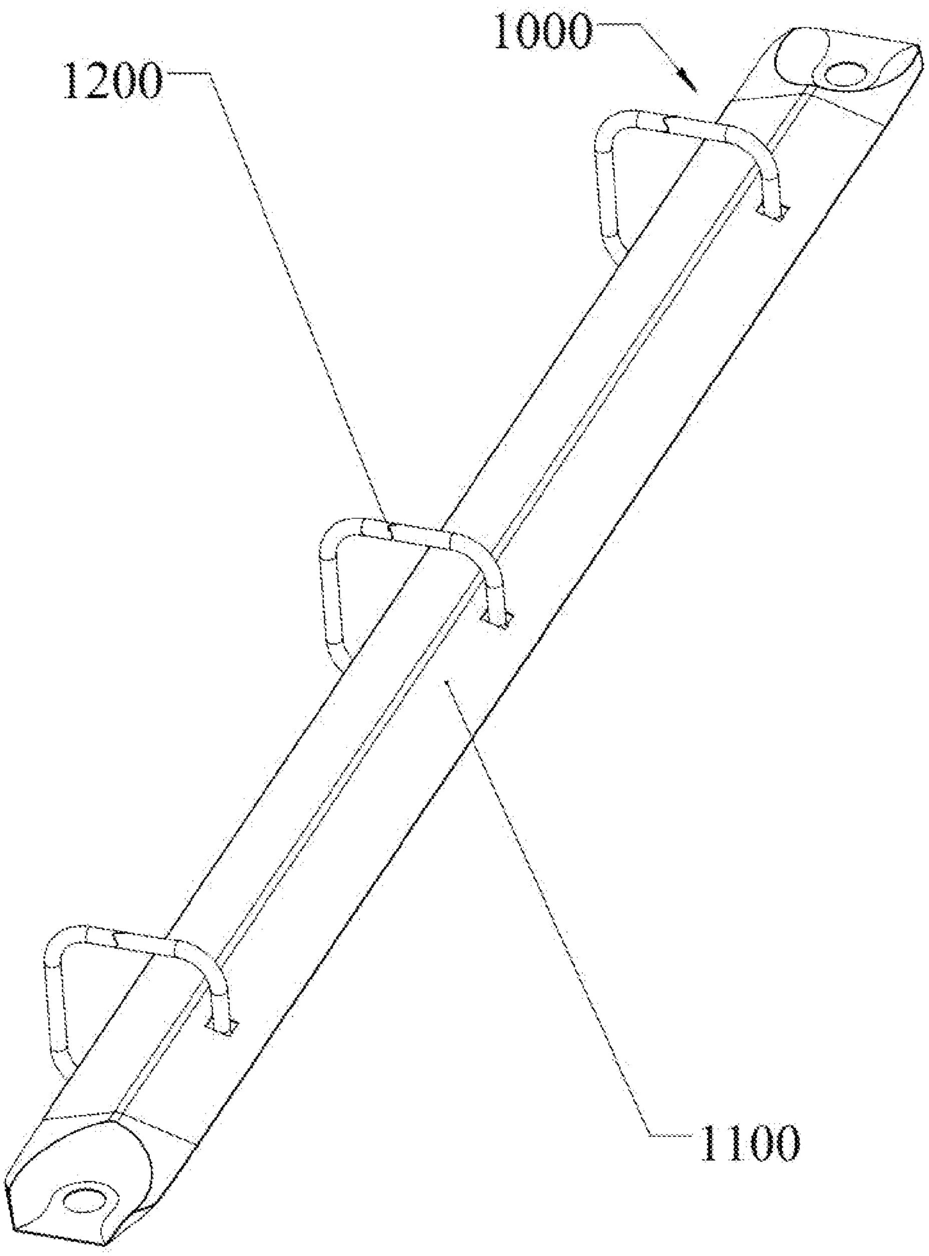
FIG. 1 is a schematic diagram of a binder in the application of the present invention.

1000, Binder capable of turning paper by 360 degrees; 1001, Main body plane; 1002, Dimension height; 1003, Dimension width; 1004, Paper edge; 1005, Paper perforation; 1100, Main body; 1101, Housing; 1102, Long side; 1103, Ridge; 1104, Mounting groove; 1105, Core plate; 1110, Left flap; 1120, Right flap; 1130, Fastening part; 1200, Retaining ring; 1210, Base point; 1211, Upper ring; 1212, Stop end; 1213, Stop surface; 1220, Lower base point; 1221, First ring part; 1222, Second ring part; 1223, Third ring part; 1224, Free end; 1225, Receiving surface; 1300, Paddle; 1310, Up-pressing part; 1320, Down-pressing part; 1400, Locking mechanism; 1500, Base point; 1510, Fixed end; 1511, Upper free end; 1512, Lower free end.

DESCRIPTION OF EMBODIMENTS

In describing the preferred embodiments, specific terminology will be resorted to for the sake of clarity. It is to be understood that each specific term includes all technical equivalents which operate in a similar manner to accomplish a similar purpose.

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

As used in the description of the inventive concept and the appended claims, the singular forms "a," "an," and "the" are intended to include the plural forms as well, unless the context clearly indicates other.

In order to make the binder turn over to a greater extent when collecting and sorting files, it does not occupy a large desktop space and is convenient to carry. The application of the invention provides a binder 1000 which can turn the paper by 360 degrees.

As a preferred embodiment of the application of the present invention, referring to FIG. 1, a binder 1000 capable of turning paper by 360 degrees includes a main body 1100 and at least one retaining ring 1200.

Figure 3:
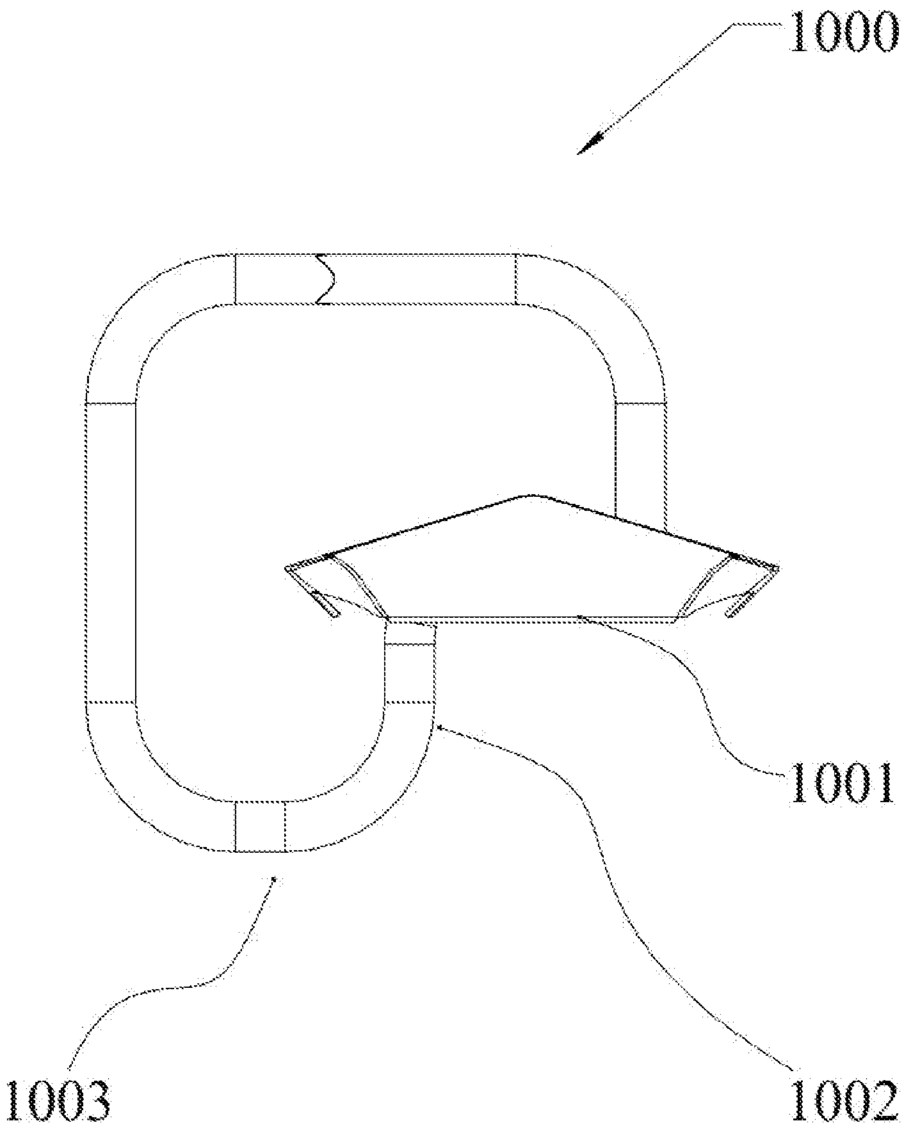
FIG. 3 is a schematic diagram of a component of the present application.

Referring to FIGS. 1 and 3, in this embodiment, the main body 1100 has a strip shape with a thickness and has a length and a width extending along the axial direction. The main body 1100 defines a main body plane 1001 along the directions of the length and width, and the retaining rings 1200 are evenly distributed in the length and fixedly connected with the main body 1100.

Figure 2:
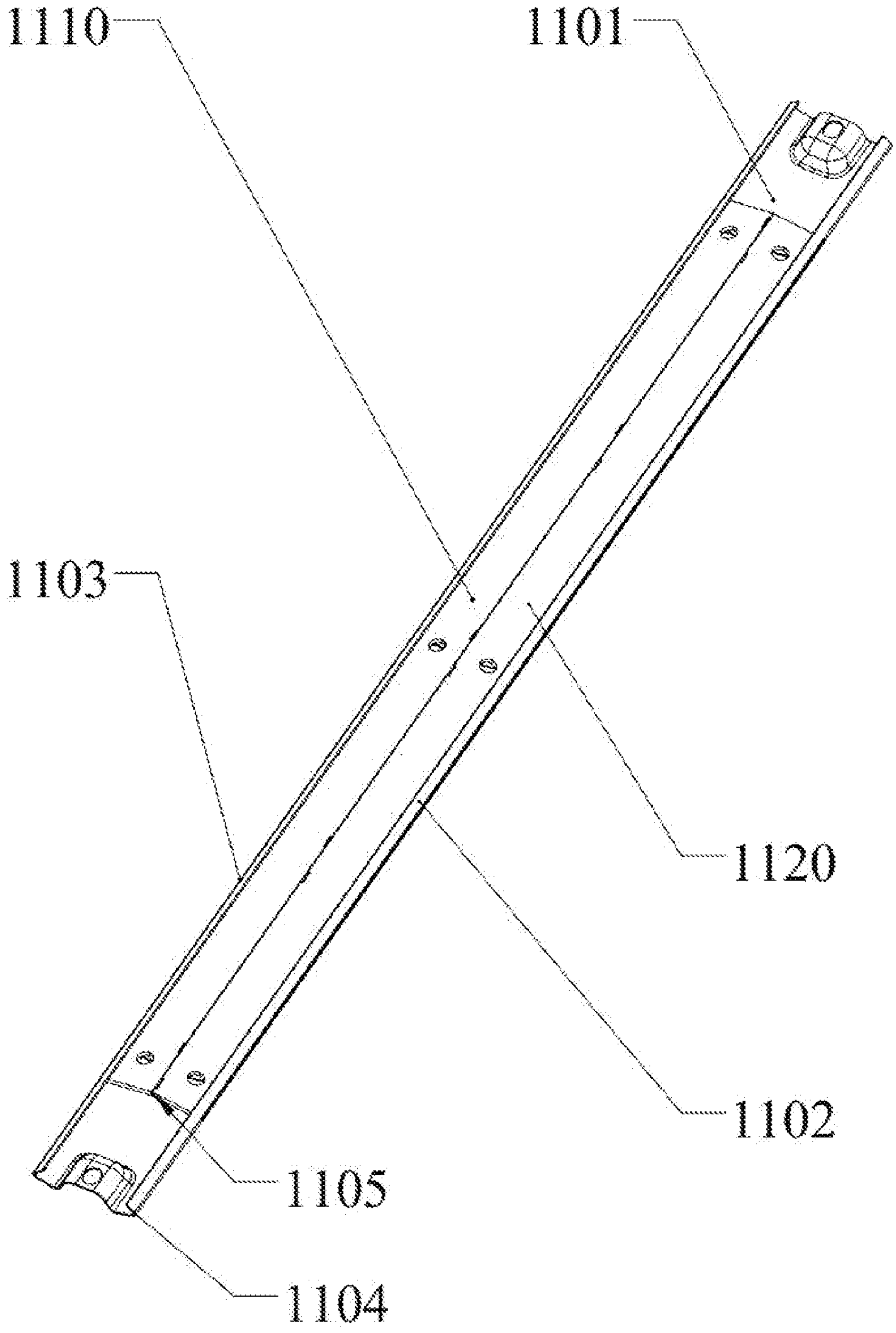
FIG. 2 is a schematic diagram of a component body in the application of the present invention.

Further, referring to FIGS. 1 and 2, the main body 1100 includes a housing 1101. The housing 1101 is in a long strip shape with two long sides 1102, and ridges 1103 are formed on the long sides 1102. The ridge 1103 is folded towards the bottom center of the main body 1100 to form a mounting groove 1104, and the folding angle is not more than 90 degrees.

Further, the two ends of the housing 1101 are concave parts, through which the binder 1000 can be connected and fixed with other stationery such as file folders or notebooks.

Figure 4:
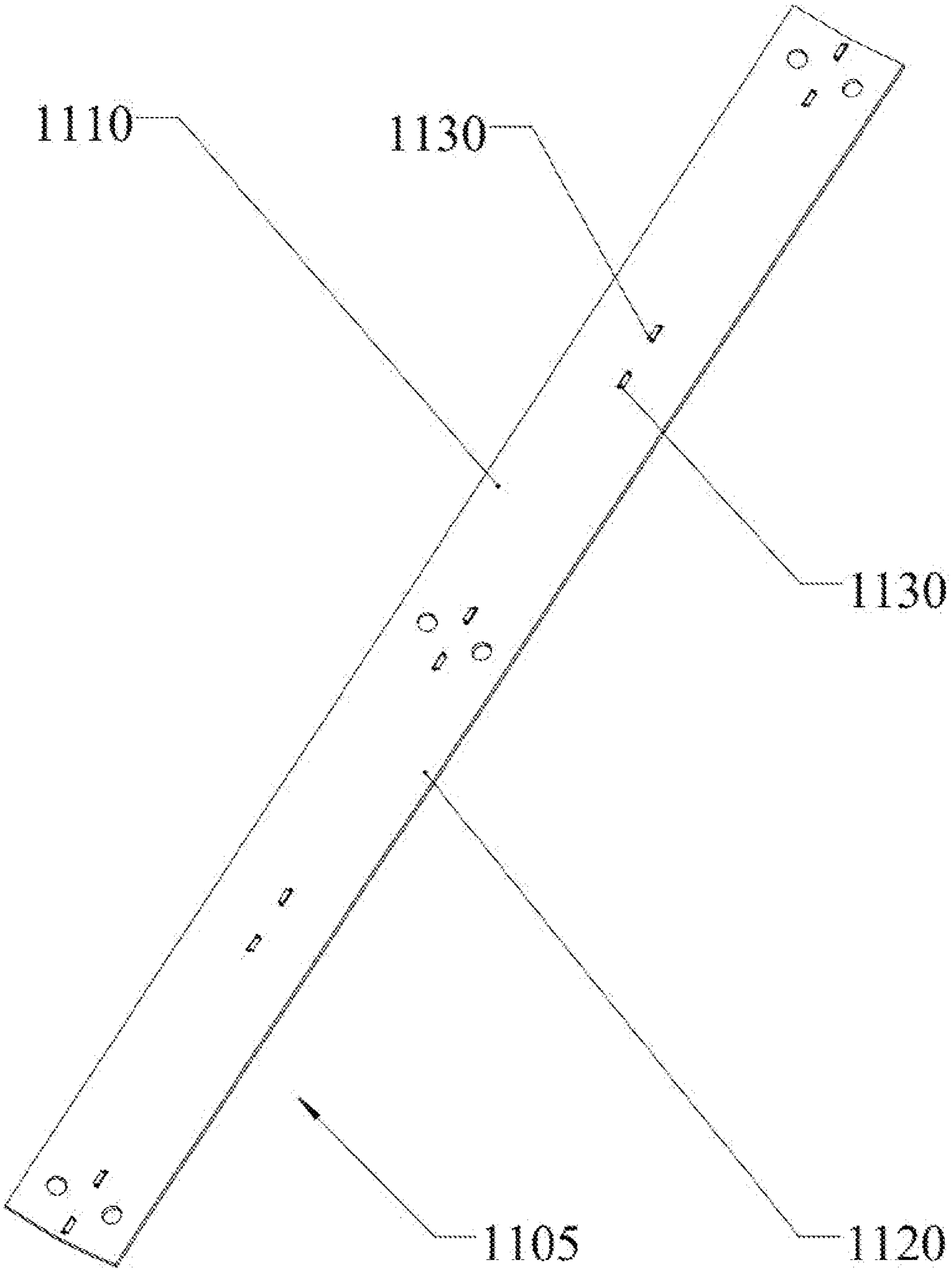
FIG. 4 is a schematic diagram of a core plate of a component applied in the present invention.

Referring to FIGS. 2 and 4, the main body 1100 further includes a core plate 1105, which is fixedly installed at the bottom of the housing 1101. The core plate 1105 includes a left flap 1110 and a right flap 1120, which have a long strip shape with thickness, wherein one ends of the left flap 1110 and the right flap 1120 respectively abut against the joint of the two long sides 1102 and the ridge 1103 and are symmetrically locked in the mounting groove 1104.

Further, there is a gap between the left flap 1110 and the right flap 1120 and the bottom of the housing 1101, which allows the left flap 1110 and the right flap 1120 to have a movable space, so that the binder 1000 which can turn the paper by 360 degrees can be opened and closed.

Further, the left flap 1110 and the right flap 1120 are both provided with a plurality of fastening parts 1130. The fastening parts 1130 on the left flap 1110 and the right flap 1120 do not correspond to each other, and the fastening parts 1130 are staggered and mutually limited, so that the left flap 1110 and the right flap 1120 are fixedly connected under the housing 1101 by fastening.

In other embodiments (not shown in the figures), the connection can be fixed by screw connection, welding connection, magnetic connection, or pin connection, as long as the left flap 1110 and the right flap 1120 can be normally connected and fixed with the housing 1101.

Figure 8:
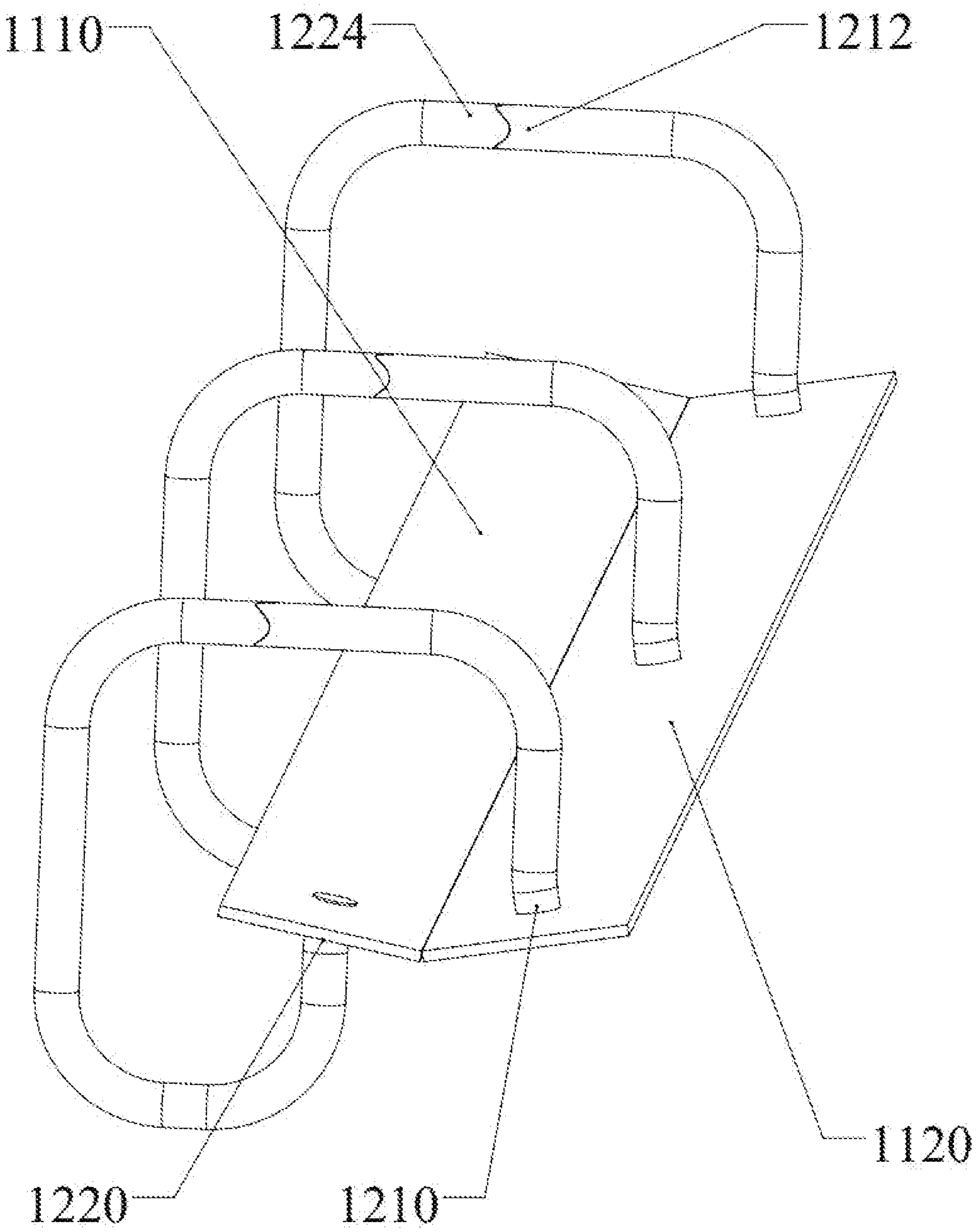
FIG. 8 is a schematic diagram of parts in the application of the present invention.
Figure 9:
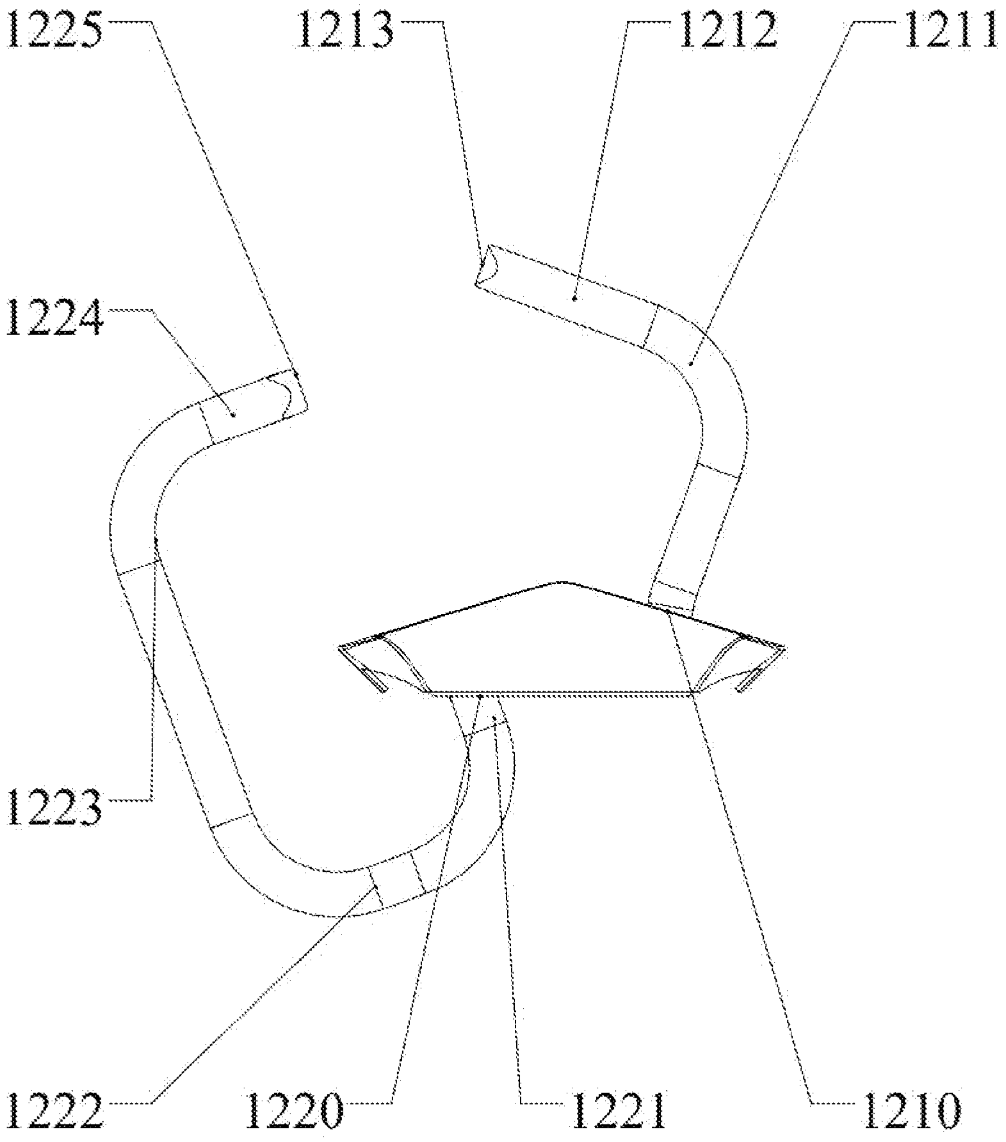
FIG. 9 is a schematic diagram of parts in the application of the present invention.

Referring to FIGS. 8 and 9, an upper base point 1210 and a lower base point 1220 are oppositely arranged along the direction of the width of the main body 1100, wherein the upper base point 1210 is arranged on the right flap 1120 and the lower base point 1220 is arranged on the left flap 1110, and the upper base point 1210 and the lower base point 1220 extend to the upper and lower sides of the main body plane 1001 respectively to complete the joint, thus forming a closed retaining ring 1200.

Further, in this embodiment, the number of retaining rings 1200 is three, and the retaining rings 1200 are made of a metal material. In other embodiments (not shown in the figure), the number of retaining rings 1200 may be one, two or other quantitative features.

Figure 10:
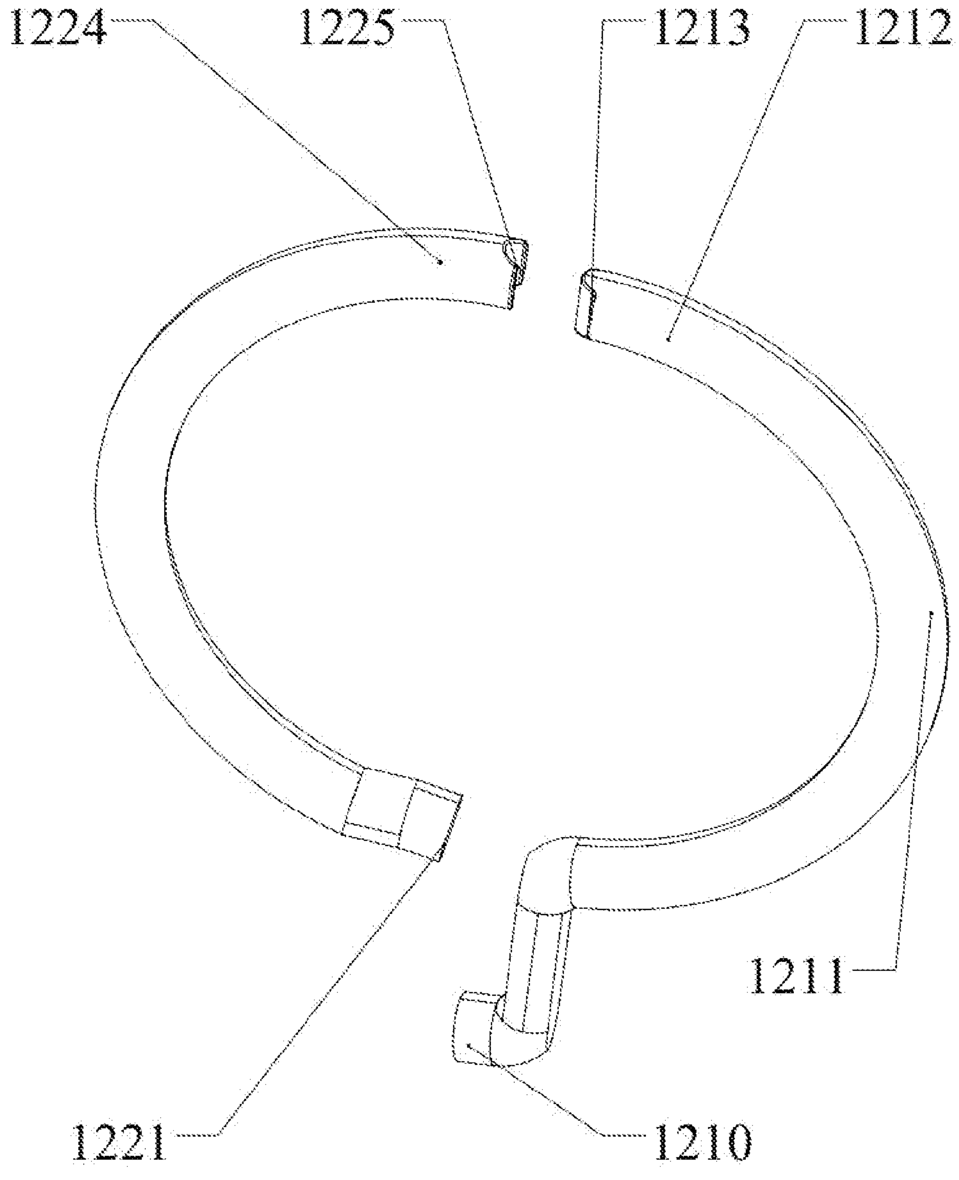
FIG. 10 is a schematic diagram of another embodiment of the retaining ring in the application of the present invention.

Similarly, in this embodiment, the retaining ring 1200 has an approximately square structure. In other embodiments (see FIG. 10), the retaining ring 1200 can also have a circular structure, an arc structure, an oval shape, an arc shape, a square shape, or other characters, geometric figures and irregular shapes.

Specifically, as shown in FIGS. 8 and 9, one end of the upper base point 1210 is fixed on the right flap 1120, and the other end of the upper base point 1210 extends above the main body plane 1001 to form an upper ring 1211 with a stop end 1212 with an irregular stop surface 1213. Similarly, one end of the lower base point 1220 is fixed on the left flap 1110, and the other end extends below the main body plane 1001, extending a dimension height 1002 and forming a first ring part 1221, and continuing to extend a dimension width 1003 away from the main body 1100 to form a second ring part 1222, wherein the first ring part 1221 has a dimension height 1002 relative to the main body plane 1001. There is a dimension width 1003 between the second ring part 1222 and the first ring part 1221, and the first ring part 1221 and the second ring part 1222 have an arc-shaped joint. Further, the second ring part 1222 continues to extend in the direction of the stop end 1212 and forms a third ring part 1223. The second ring part 1222 and the third ring part 1223 have a smoothly transitional joint, and the third ring part 1223 has a free end 1224 which is provided with a receiving surface 1225 corresponding to the stop surface 1213.

Figure 5:
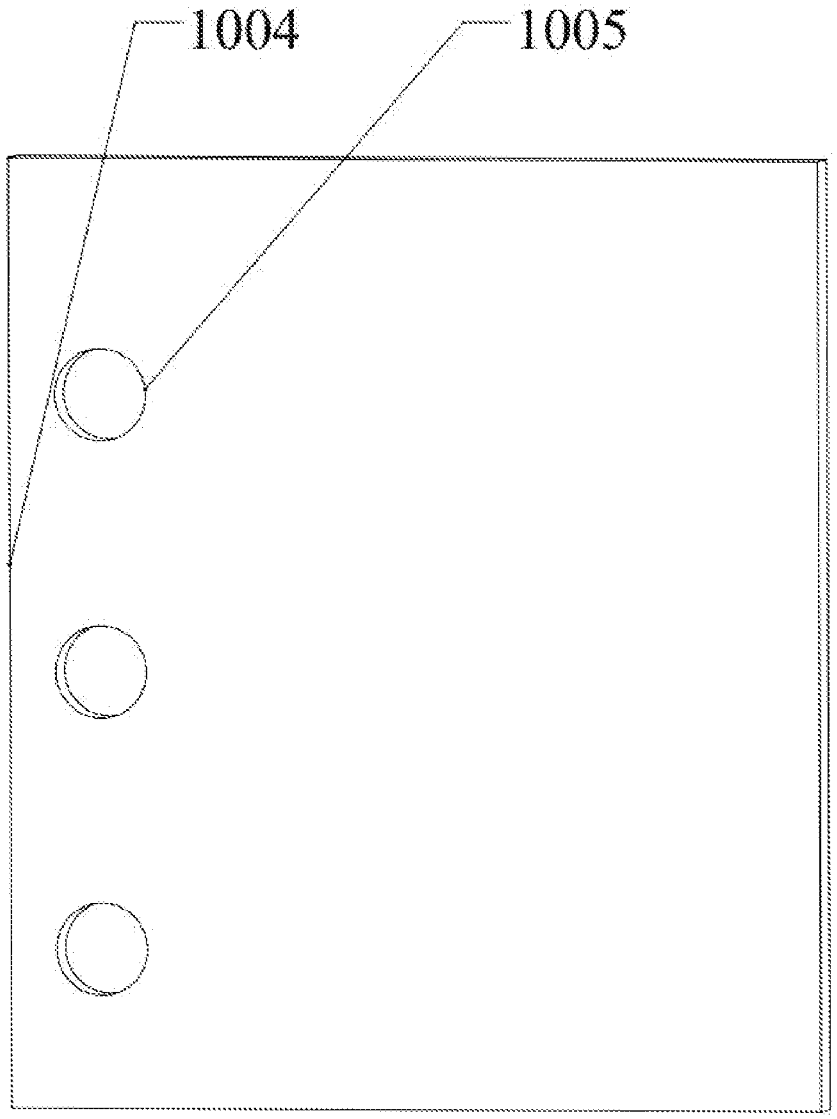
FIG. 5 is a schematic diagram of the paper in the application of the present invention.

Referring to FIG. 5, further, when the stop end 1212 is engaged with the free end 1224, the joint is far away from the main body 1100, and the stop surface 1213 is closely attached to the receiving surface 1225. At the same time, in order to enable the paper to be folded 360 degrees in the retaining ring 1200, the dimensions of the dimension height 1002 and the dimension width 1003 are not less than the distance between the paper edge 1004 and the paper perforation 1005.

In this embodiment, the binder 1000 which can turn the paper by 360 degrees has a fastened state and a released state.

Figure 6:
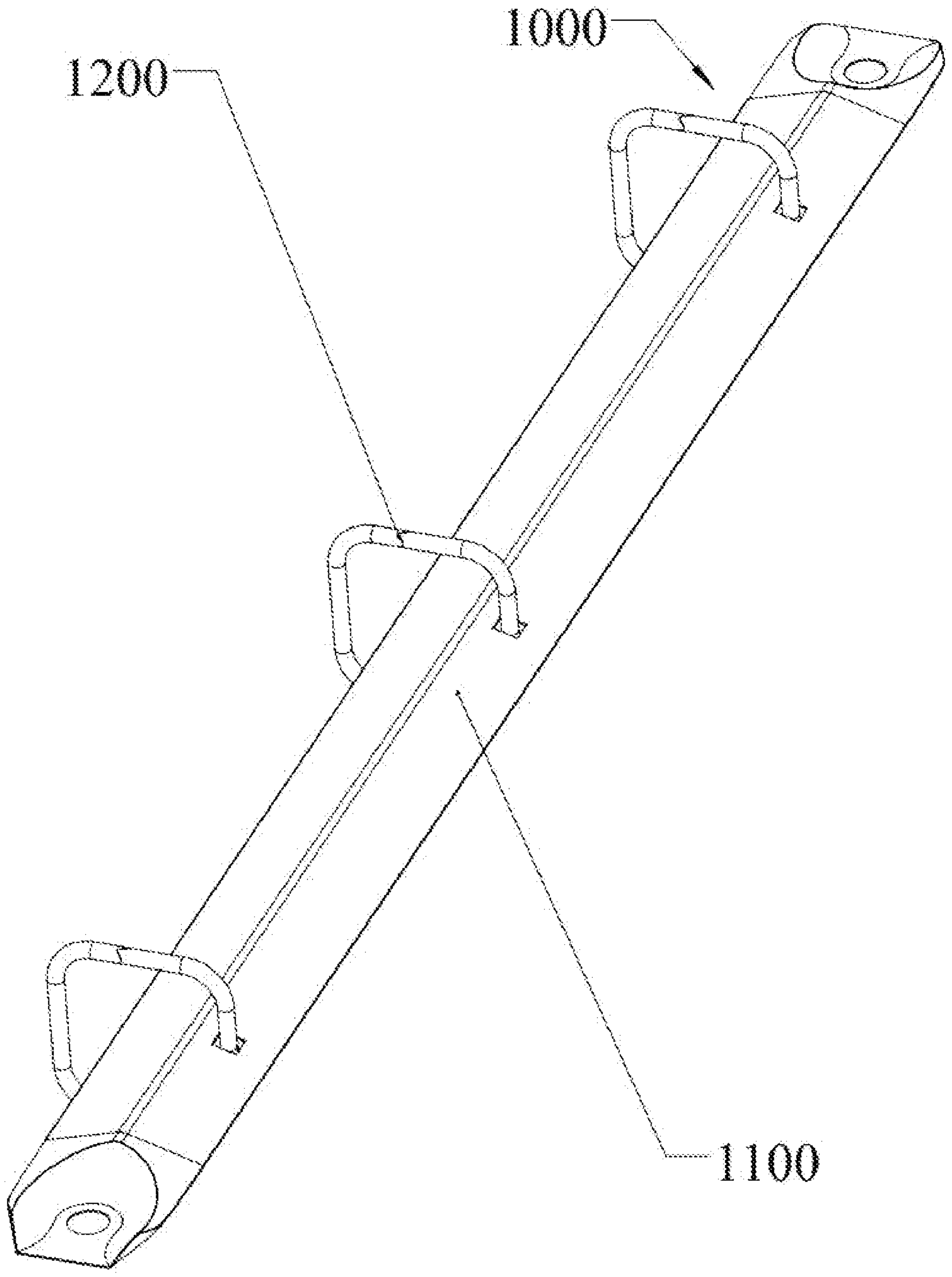
FIG. 6 is a schematic diagram of the fastened state in the application of the present invention.

Referring to FIG. 6, when the binder 1000 which can turn the paper by 360 degrees is in the fastened state, the fastening part 1130 restricts the relative rotation between the left flap 1110 and the right flap 1120, and at the same time, the stop end 1212 is engaged with the free end 1224.

Figure 7:
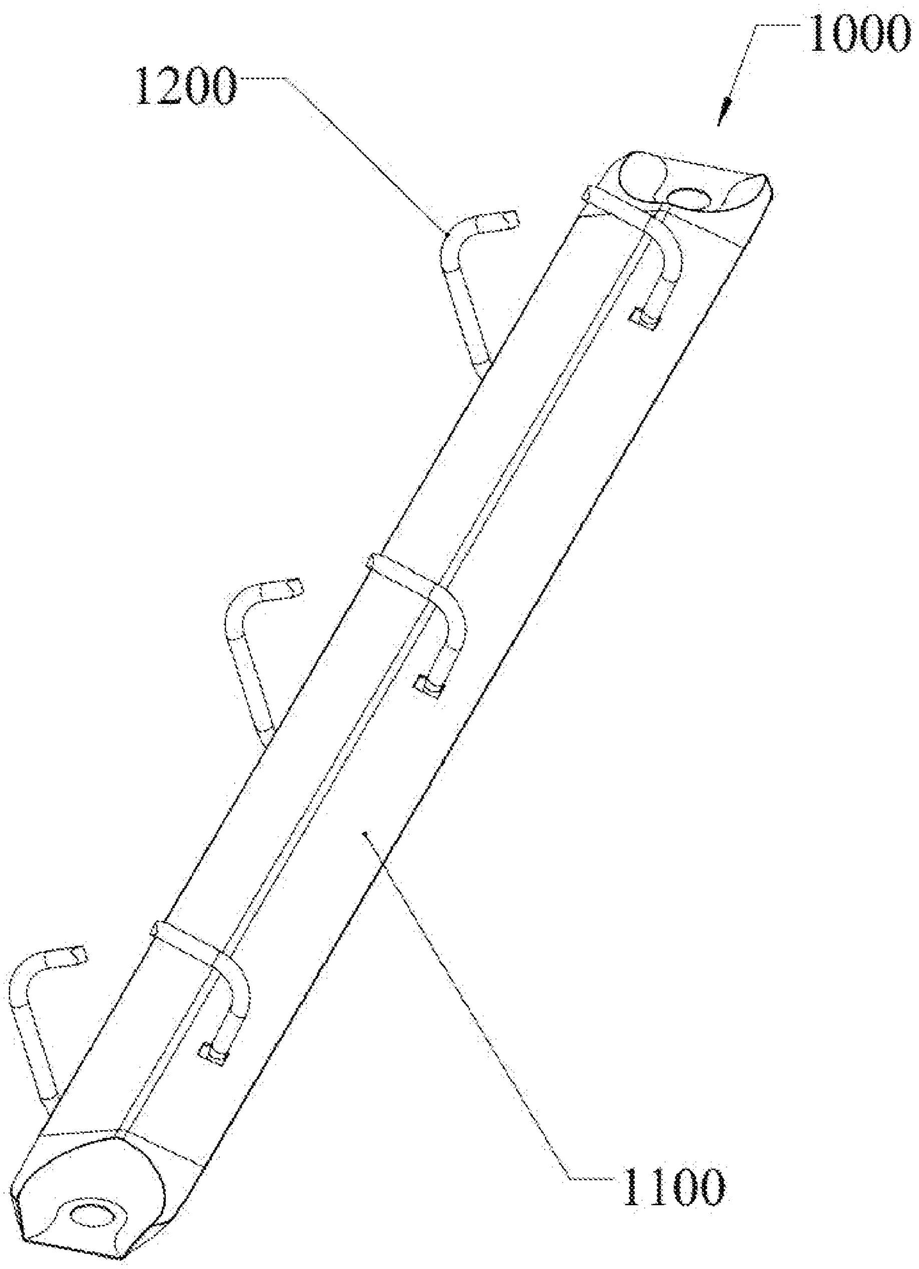
FIG. 7 is a schematic diagram of the released state in the application of the present invention.

Similarly, referring to FIG. 7, when the binder 1000 which can turn the paper by 360 degrees is in the released state, the housing 1101 restricts the relative rotation between the left flap 1110 and the night flap 1120, and at the same time, the stop end 1212 is far away from the free end 1224.

Figure 11:
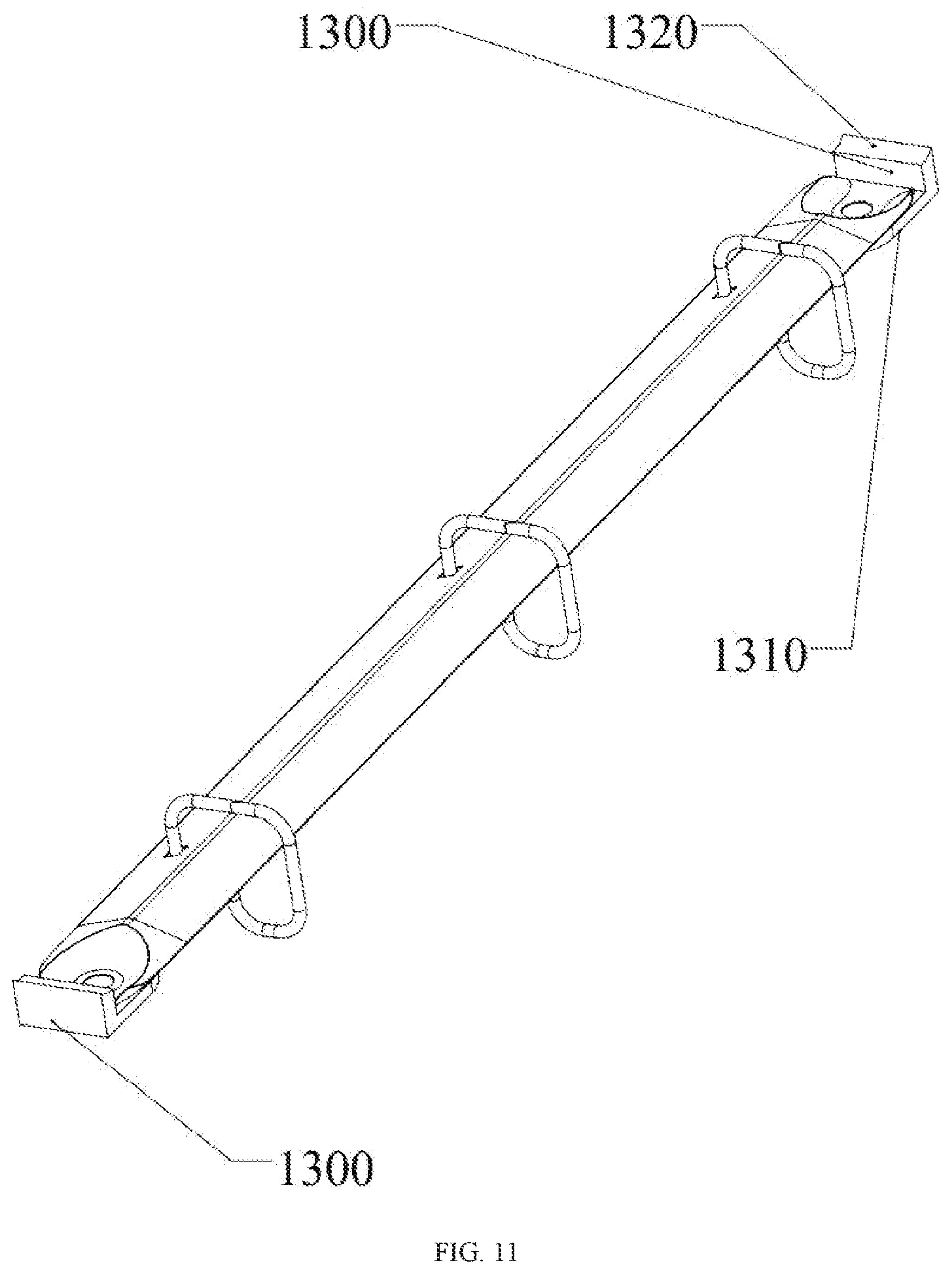

Referring to FIG. 11, the main body 1100 further includes paddles 1300, which is equivalent to a switch for controlling the binder 1000, and the paddles 1300 are symmetrically arranged at both ends of the mounting groove 1104.

Further, the paddle 1300 includes an up-pressing part 1310 and a down-pressing part 1320. By pressing the down-pressing part 1320, the up-pressing part 1310 can generate a pressing force on the core plate 1105, and the pressing force switches the core plate 1105 between the fastened state and the released state.

In other embodiments (not shown), the control mode may include physical buttons, such as rocker, dial, slide switch and joystick, click wheel, etc. In some alternative embodiments, the control device may or may not be coupled to any of the following: a keyboard, an infrared port, a USB port and a pointing device, such as a mouse. Not shown in some embodiments, the control device may also be an electronic device, such as a touch screen, a computer device and other control system devices.

Figure 12:
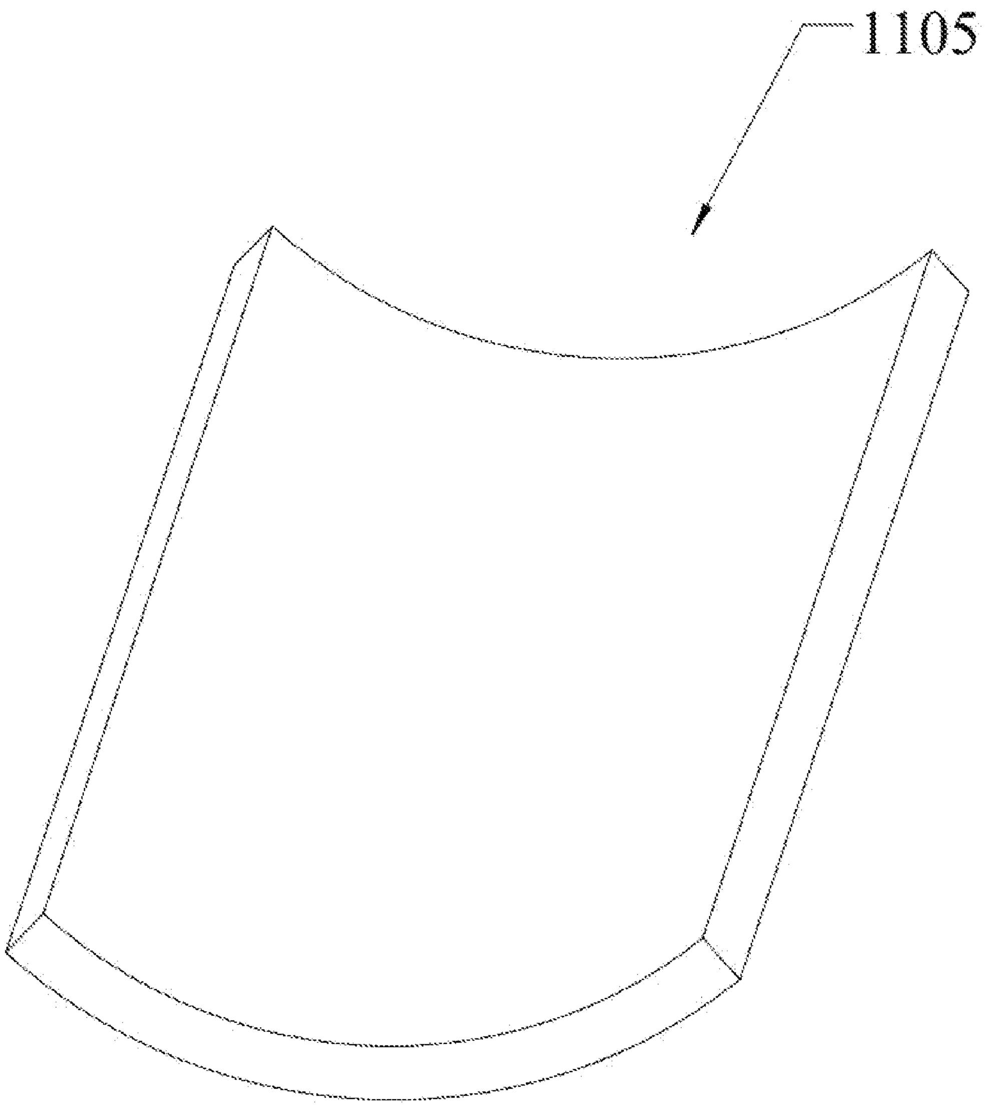
FIG. 12 is a schematic diagram of the core plate in the application of the present invention.
Figure 13:
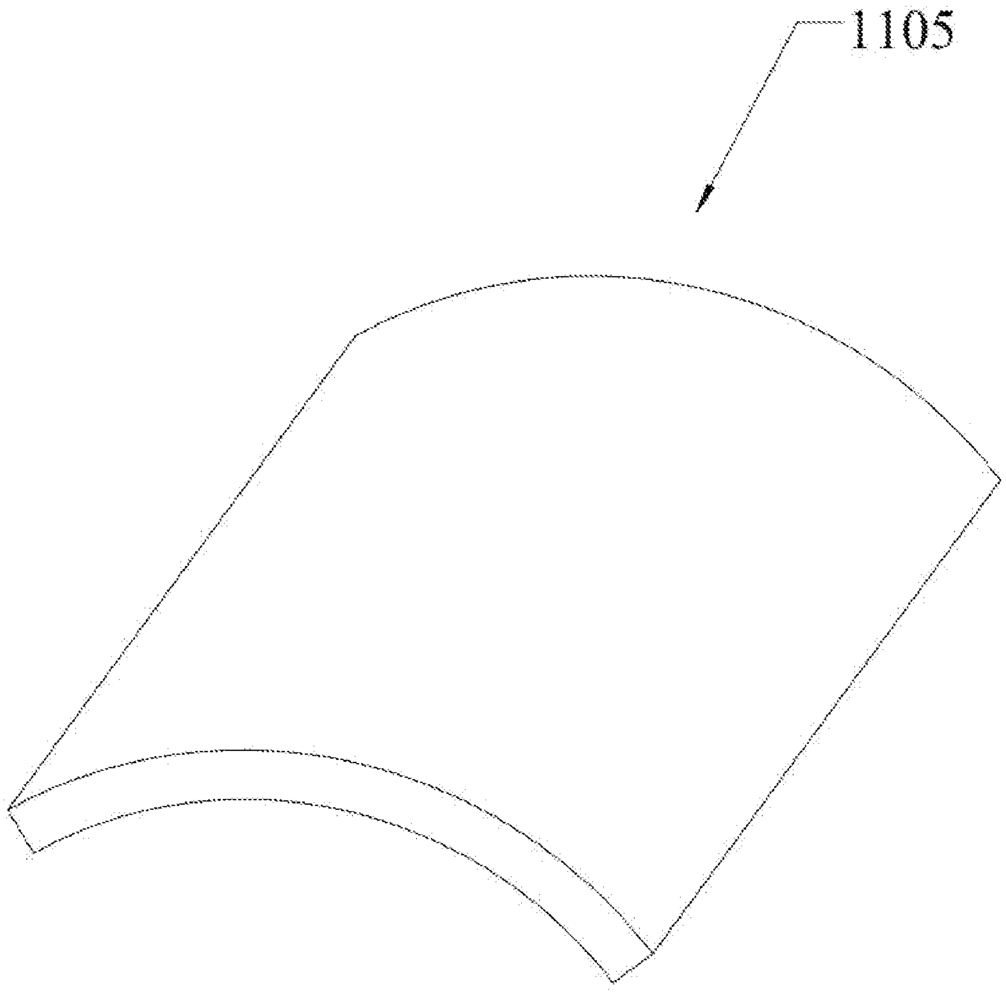
FIG. 13 is a schematic diagram of the core plate in the application of the present invention.

Referring to FIGS. 12 and 13, in another embodiment, the main body 1100 further includes a core plate 1105 made of a high-toughness material. Due to the high toughness structure, the core plate 1105 has a roughly V-shaped cross section and a roughly inverted V-shaped cross section. The core plate 1105 has a long strip shape with a thickness and passes through the mounting groove 1104. Both ends of the core plate 1105 respectively abut against the joint of the long side 1102 and the ridge 1103.

Further, as shown in FIG. 12, when the binder 1000 capable of turning the paper by 360 degrees is in the fastened state, the core plate 1105 forms a roughly V-shaped cross section, and at the same time, the stop end 1212 is engaged with the free end 1224.

Similarly, referring to FIG. 13, when the binder 1000, which can turn the paper by 360 degrees, is in the released state, the core plate 1105 forms a roughly inverted V-shaped cross section, and at the same time, the stop end 1212 is far away from the free end 1224.

In other embodiments (not shown in the drawings), the material of the core plate 1105 can also be carbon fiber material, metal material, plastic material and other materials with sufficient strength and toughness, as long as the binder 1000 can be changed between the released state and the fastened state. Meanwhile, in other embodiments, the core plate 1105 can be composed of other number of characteristic plates. In other embodiments (not shown in the drawings), the interface shapes of the core plate 1105 can also be "W" shape and inverted "W" shape, or "U" shape and inverted "U" shape, or other characters such as "M" shape and inverted "M" shape, geometric figures and irregular shapes.

As another preferred embodiment of the application of the present invention, the application of the present invention also provides a binder 1000 which can turn the paper by 360 degrees.

Referring to FIG. 1 to FIG. 3, a binder 1000 capable of turning paper by 360 degrees includes a main body 1100 and at least one retaining ring 1200.

Referring to FIG. 1 to FIG. 3, in this embodiment, the main body 1100 has a long strip shape with thickness and has a length and a width extending along the axial direction. The main body 1100 defines a main body plane 1001 along the length and width direction, and the retaining rings 1200 are evenly distributed in the length and are fixedly connected with the main body 1100 by welding.

In other embodiments (not shown in the figures), the connection can be fixed by screw connection, magnetic connection, or pin connection, as long as the retaining ring 1200 can be normally connected and fixed with the main body 1100.

Further, an upper base point 1210 and a lower base point 1220 are arranged along the direction of the width of the main body plane 1001; the lower base point 1220 extends below the main body plane 1001, and the upper base point 1210 extends above the main body plane 1001; the upper base point 1210 and the lower base point 1220 respectively extend and are joined at places far away from the main body 1100, thus forming a retaining ring 1200, which is a closed annular structure with a roughly circular cross section and a path for the paper to turn 360 degrees, and at least a part of the path is arc-shaped.

Further, as shown in FIG. 5, in order to make the paper turn 360 degrees in the retaining ring 1200, the distance from the lower base point to the lower part of the main body plane 1001 is not less than the distance from the paper edge 1004 to the paper perforation 1005.

Specifically, the upper base point 1210 extends above the main body plane 1001 and has a stop end 1212, and the lower base point 1220 extends below the main body plane 1001 and has a free end 1224. The main body 1100 is provided with a locking mechanism 1400, which can control the closure and disconnection of the path and has a locked state and an unlocked state.

Figure 14:
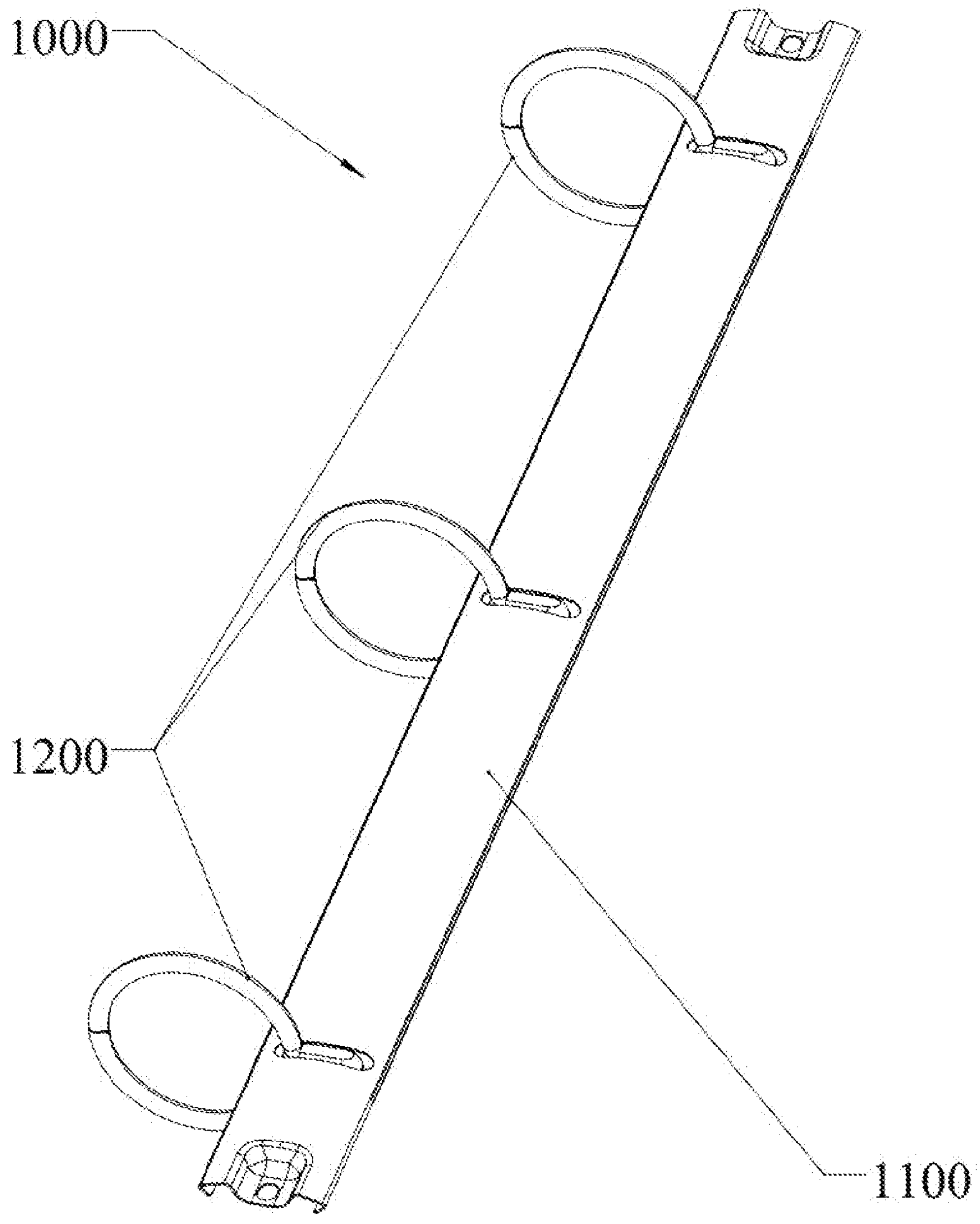
FIG. 14 is a schematic diagram of the binder of the present application.

Referring to FIG. 14, when the locking mechanism 1400 is in the locked state, the stop end 1212 engages with the free end 1224, and the path is closed, and the paper can be turned 360 degrees.

Figure 15:
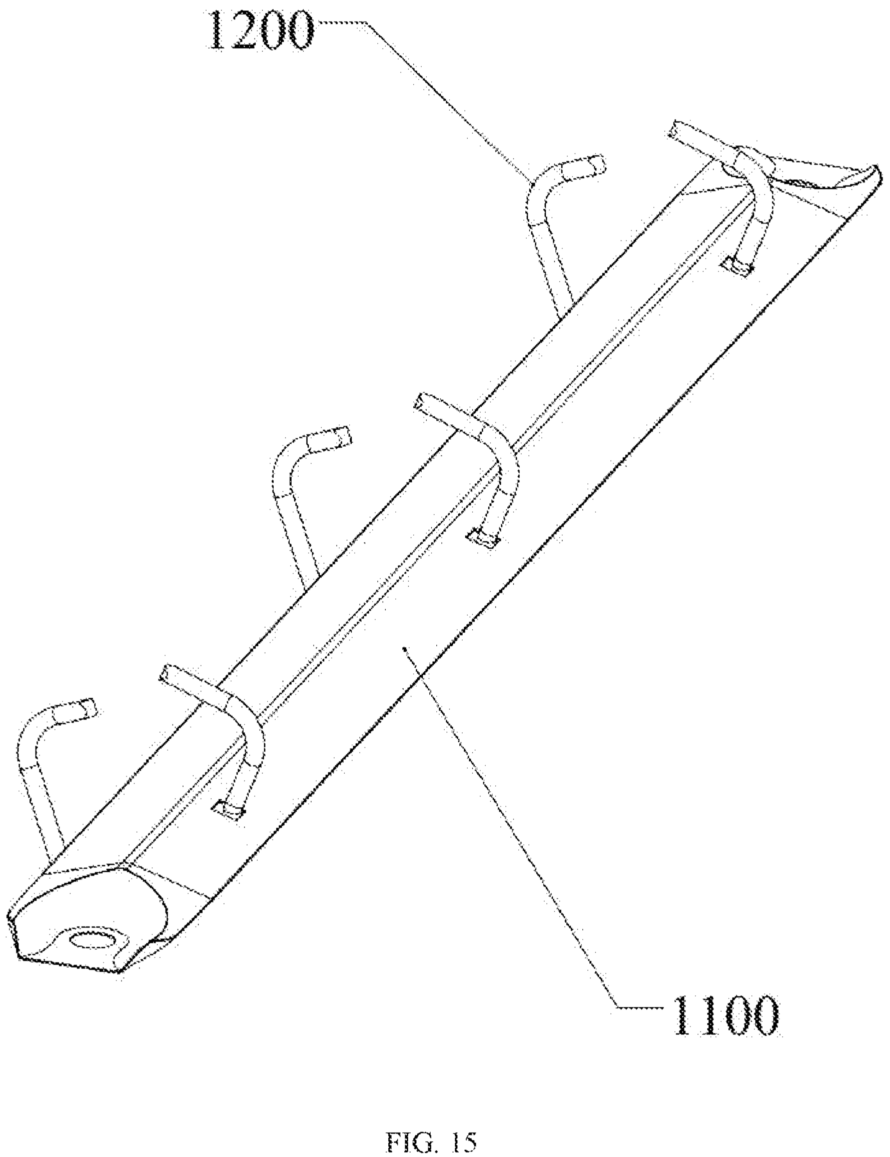
FIG. 15 is a schematic diagram of the unlocked state of the present application.

Referring to FIG. 15, when the locking mechanism 1400 is in the unlocked state, the stop end 1212 is far away from the free end 1224, the path is disconnected, and the paper can be added to or taken down from the retaining ring 1200.

As another preferred embodiment of the application of the present invention, the application of the present invention also provides a binder 1000 capable of turning paper by 360 degrees.

Figure 16:
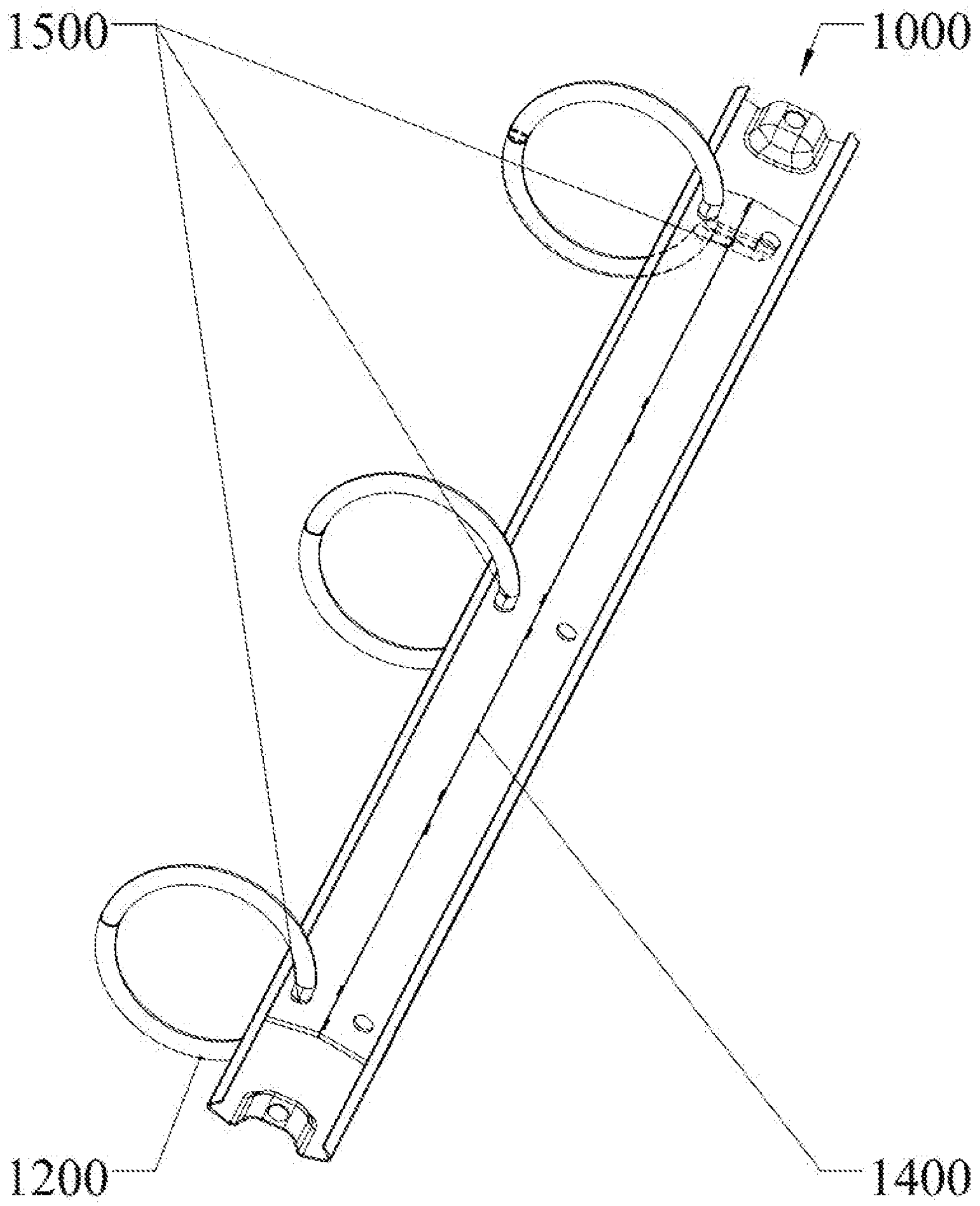
FIG. 16 is a schematic diagram of the fastened state of the present application.

Referring to FIG. 16, a binder 1000 capable of turning paper by 360 degrees includes a main body 1100 and at least one retaining ring 1200.

Referring to FIG. 16, the main body 1100 has a long strip shape with a thickness and has a length and a width extending along the axial direction. The main body 1100 defines a main body plane 1001 along the directions of the length and width, and the retaining rings 1200 are evenly distributed along the length and are fixedly connected with the main body 1100 by welding.

Further, the main body 1100 has a base point 1500, and the base point 1500 forms a fixed end 1510 on the main body 1100. The fixed end 1510 extends away from the main body plane 1001 and forms an upper free end 1511 or a lower free end 1512 respectively, and the fixed end 1510 extends in the direction of the width. In order to make the paper turn over better, the extended width distance is not greater than the width of the main body 1100. When extended by a width distance, an opposite lower free end 1512 or upper free end 1511 will be formed, and the formed upper free end 1511 and lower free end 1512 will continue to extend and be joined away from the main body 1100, so that the retaining ring 1200 has a path for the paper to turn 360 degrees.

Figure 17:
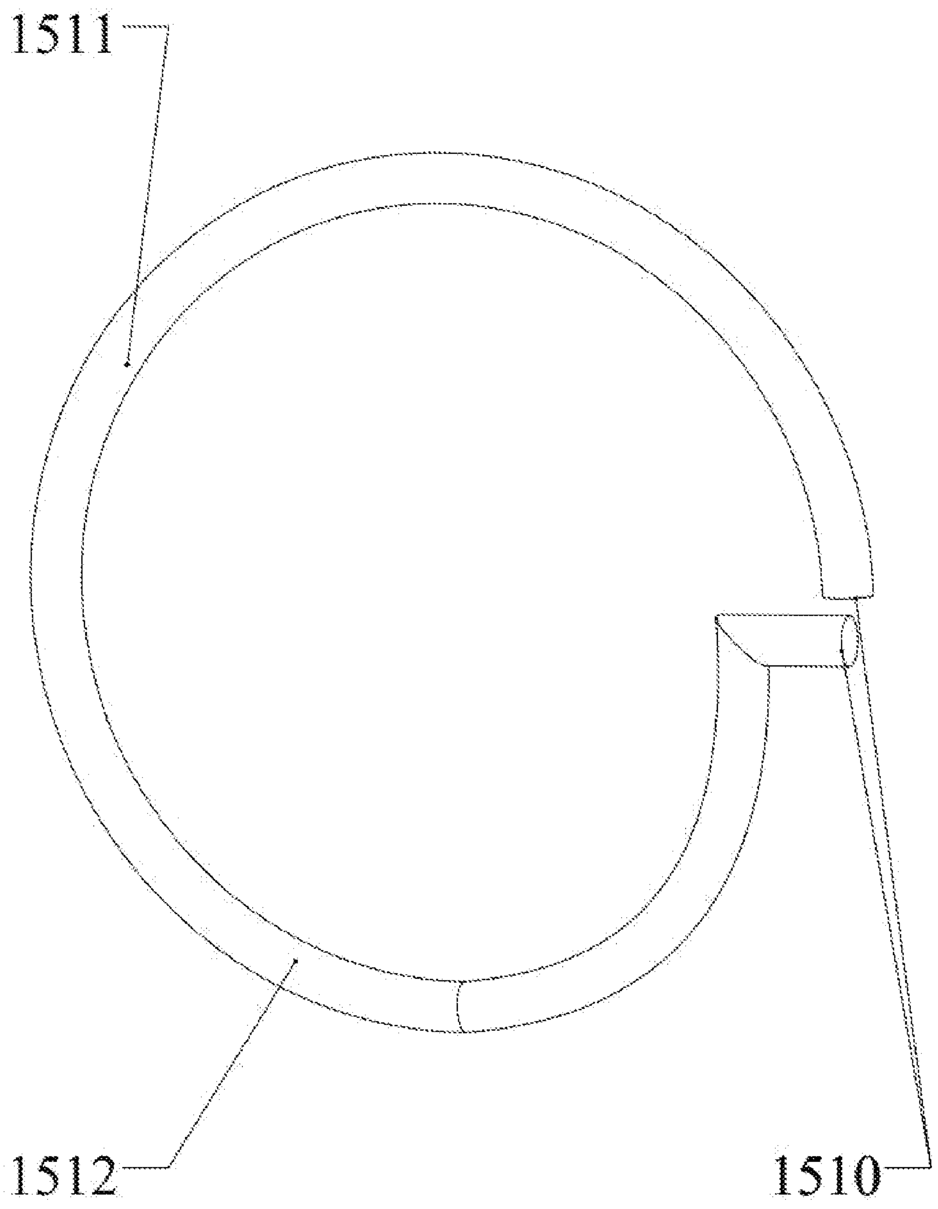
FIG. 17 is a schematic diagram of the retaining ring of the present application.

Specifically, in this embodiment, as shown in FIG. 17, the base point 1500 extends above the main body plane 1001 to form an upper free end 1511 and a fixed end 1510. At the same time, the fixed end 1510 extends in the direction of the width, and after extending for a width distance, it continues to extend below the main body plane 1001 to form a lower free end 1512. The upper free end 1511 and the lower free end 1512 are joined to form a closed path, and at least a part of the path has an are trajectory. Moreover, in order to make the formed path for the paper to turn 360 degrees in the retaining ring 1200, the vertical height between the upper free end 1511 and the main body plane 1001 and the vertical height between the lower free end 1512 and the main body plane 1001 are both not less than the distance between the paper edge 1004 and the paper perforation 1005.

Figure 18:
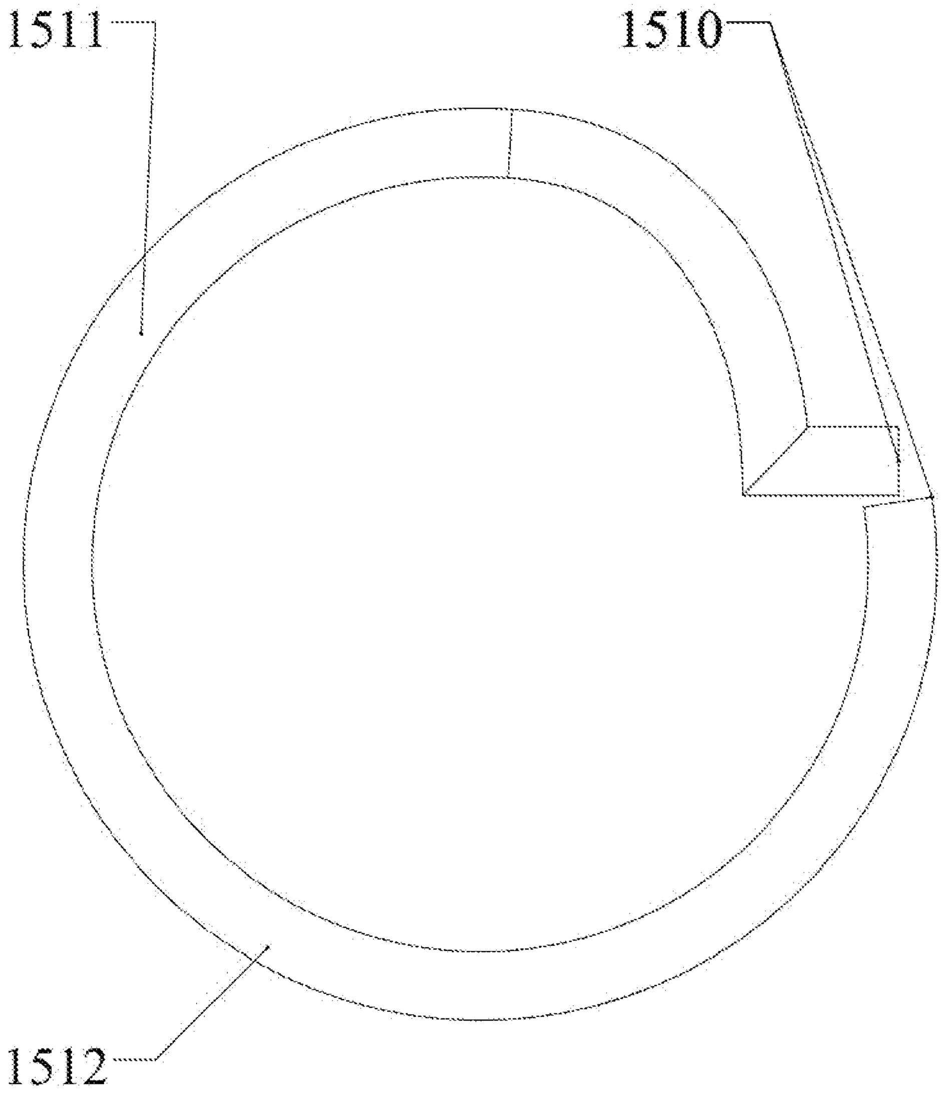
FIG. 18 is a schematic diagram of the retaining ring of the present application.

In another embodiment, as shown in FIG. 18, the base point 1500 extends below the main body plane 1001, forming a lower free end 1512 and a fixed end 1510. At the same time, the fixed end 1510 extends in the direction of the width, and after extending for a width distance, it continues to extend above the main body plane 1001 to form an upper free end 1511. The upper free end 1511 and the lower free end 1512 are joined to form a closed path, and at least a part of the path has an arc trajectory. Moreover, in order to make the formed path for the paper to turn 360 degrees in the retaining ring 1200, the vertical height between the upper free end 1511 and the main body plane 1001 and the vertical height between the lower free end 1512 and the main body plane 1001 are both not less than the distance between the paper edge 1004 and the paper perforation 1005.

In other embodiments (not shown in the figure), the base point structure constituting the retaining ring 1200 can also be other quantitative features, which are not limited to the quantitative features applied in the present invention, as long as the retaining ring 1200 can be constructed so that the paper can be turned over 360 degrees.

In the process of using the binder 1000, it is necessary to punch the collected files. The hole is punched so that the document can be fixed by the retaining ring 1200. The location and size of the perforation need to match the retaining ring 1200.

Next, the paddles 1300 at both ends of the binder 1000 are pressed to open the retaining ring 1200 so that files can be put into the retaining ring 1200. When placing, it is necessary to pay attention to the order and direction in which the files are placed, so as to ensure the convenience when the files are consulted later. Finally, the retaining ring 1200 is closed to fix the file and prevent the file from failing off when moving the binder, thus completing the storage and sorting.

In the broad sense of the present invention, the binder 1000 which can turn the paper by 360 degrees can also be used in other scenes and fields, mainly including: offices, where binders are common stationery for sorting and saving files, making file management more convenient and efficient; or school, students can use binders to organize and save class notes, homework, test paper, etc.; or the library, the library can use binders to sort out and save the borrowing records of books and the classified information of books, or a hospital, which can use binders to sort out and save patients' medical records, examination reports, etc. or family, where binders can also be used to organize and save various documents, such as financial records and important documents of family members.

In a word, the binder that can turn the paper by 360 degrees and its usage greatly improve the efficiency and convenience of file management. No matter in school, office or library, you can use this binder wherever you need to organize and save documents. At the same time, due to its characteristic of being capable of turning 360 degrees, users can consult files more conveniently and quickly.

To sum up, the application of the present invention provides a brand-new binder, which can realize 360-degree turning of files, so that users can consult files more conveniently without turning the binder back and forth, thus improving the consulting efficiency and being more convenient to read and write. At the same time, through the unique retaining ring design, it makes the storage and arrangement of files simpler and more efficient, makes the work simpler and more efficient, and further improves the experience. When in use, it is only necessary to punch the files to be stored and sorted, then align the holes on the files with the retaining ring, put them in the retaining ring, and close the retaining ring to complete the storage and sorting. This method is simple and easy, which greatly improves the office efficiency.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention has now been described in detail for the purposes of clarity and understanding. However, those skilled in the art will appreciate that certain changes and modifications may be practiced within the scope of the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

What is claimed is:

1. A binder capable of turning paper by 360 degrees, the binder comprising:

a main body and at least one retaining ring, wherein the main body has a core plate, and the core plate comprises a left flap and a right flap; and wherein, the main body has a length and a width extending along an axial direction, the main body defines a main body plane along directions of the length and the width, and the at least one retaining rings are evenly distributed on the length; and wherein the main body comprises a housing, and the housing comprises two sides extending along the direction of the length, wherein ridges are formed on the two sides, and the ridges are folded towards a center of the main body to form a mounting groove; and wherein there is a folding angle of not more than 90 degrees between the ridges and the main body plane; and wherein, the at least one retaining ring is fixedly connected with the main body, and comprises an upper base point and a lower base point which are oppositely arranged along the direction of the width; and wherein after extending a dimension height below the main body plane, and the lower base point continues to extend a dimension width away from the main body, forming a free end; and wherein the dimensions of the dimension height and the dimension width are not less than a distance between a paper edge and a paper perforation; and the upper base point extends above the main body plane and engages with the free end of the lower base point away from the main body, so that the at least one retaining ring has a path for paper to turn 360 degrees, wherein, a gap between the left flap and the right flap and a bottom of the housing thereby allowing the left flap and the right flap to have a movable space, so that the binder can turn the paper by 360 degrees.

2. The binder capable of turning paper by 360 degrees according to claim 1, wherein the left flap and the right flap are symmetrically arranged in the mounting groove, wherein, each end of the left flap and the right flap abut against a joint of the two sides and the ridges, and other ends are provided with a plurality of fastening parts, wherein the other ends of the left flap and the right flap form a rotatable fastening connection through the fastening parts.

3. The binder capable of turning paper by 360 degrees according to claim 2, wherein a fastening part of the left flap and a fastening part of the right flap do not correspond to each other, wherein the core plate has a fastened state and a released state through the fastening connection of the left flap and the right flap; and when the core plate is in the fastened state, the fastening part restricts a relative rotation between the left flap and the right flap; and when the core plate is in the released state, the housing restricts the relative rotation between the left flap and the right flap.

4. The binder capable of turning paper by 360 degrees according to claim 3, wherein the upper base point and the lower base point are respectively arranged on the right flap and the left flap, wherein the upper base point extends above the main body plane and forms an upper ring, and the upper ring has a stop end; and wherein when the core plate is in the fastened state, the stop end engages with the free end; and when the core plate is in the released state, the stop end is away from the free end.

5. The binder capable of turning paper by 360 degrees according to claim 4, wherein the stop end has a stop surface, and the free end is provided with a receiving surface corresponding to the stop surface; and when the stop end is engaged with the free end, the stop surface is attached to the receiving surface.

6. The binder capable of turning paper by 360 degrees according to claim 5, wherein the lower base point extends below the main body plane to form a first ring part, and continues to extend away from the main body plane to form a second ring part, wherein the first ring part has a dimension height relative to the main body plane; and the second ring part has a dimension width relative to the first ring part, wherein there is an arc-shaped extending path between the first ring part and the second ring part.

7. The binder capable of turning paper by 360 degrees according to claim 6, wherein the second ring part continues to extend toward the stop end and forms a third ring part, wherein there is a smoothly-transitional extending path between the third ring part and the second ring part, an end of the third ring part is engaged with the stop end, so that the retaining ring has a smooth path for the paper to turn 360 degrees.

8. The binder capable of turning paper by 360 degrees according to claim 7, wherein the main body further comprises paddles symmetrically arranged at both ends of a mounting groove, wherein the paddles comprise an up-pressing part and a down-pressing part; and the up-pressing part is used for up-pressing the core plate and switching the core plate between the fastened state and the released state.

9. The binder capable of turning paper by 360 degrees according to claim 1, wherein the main body further comprises the core plate, which is made of a high-toughness material and has a V-shaped cross section and an inverted V-shaped cross section, wherein the core plate penetrates through the mounting groove, and both ends of the core plate respectively abut against a joint of the two sides and the ridges.

10. The binder capable of turning paper by 360 degrees according to claim 9, wherein the upper base point and the lower base point are symmetrically arranged on the core plate along the direction of the width, wherein the upper base point extends above the main body plane and forms an upper ring, and the upper ring has a stop end; and when the core plate forms a V-shaped cross section, the stop end engages with the free end; and when the core plate forms an inverted V-shaped cross section, the stop end is away from the free end.

11. A binder capable of turning paper by 360 degrees, the binder comprising:

a main body and at least one retaining ring, wherein the main body has a core plate, and the core plate comprises a left flap and a right flap; and wherein, the main body has a length and a width extending along an axial direction, the main body defines a main body plane along direction of the length and the width, and the at least one retaining rings are evenly distributed on the length; and wherein, the at least one retaining ring is fixedly connected with the main body, and comprises an upper base point and a lower base point which are oppositely arranged along the direction of the width, wherein the lower base point extends below the main body plane, forming a free end and the upper base point extends above the main body plane, wherein the upper base point extends above the main body plane and is engaged with the free end of the lower base point away from the main body, so that the at least one retaining ring has a path for paper to turn 360 degrees; and wherein the upper base point extends above the main body plane and has a stop end; and the main body is provided with a locking mechanism, which can control a closure and disconnection of the path, including a locked state and an unlocked state; and when the locking mechanism is in a locked state, the stop end is engaged with the free end, and the path is closed for the paper to turn 360 degrees; and when the locking mechanism is in the unlocked state, the stop end is away from the free end, and the path is disconnected, wherein, a gap between the left flap and the right flap and a bottom of a housing thereby allowing the left flap and the right flap to have a movable space, so that the binder can turn the paper by 360 degrees.

12. The binder capable of turning paper by 360 degrees according to claim 11, wherein a distance from the lower base point to the lower side of the main body plane is not less than a distance from a paper edge to a paper perforation.

13. The binder capable of turning paper by 360 degrees according to claim 12, wherein the retaining ring has a substantially circular cross section, and at least a part of the path is an arc path.

14. A binder capable of turning paper by 360 degrees, the binder comprising:

a main body and at least one retaining ring, wherein the main body has a core plate, and the core plate comprises a left flap and right flap; and wherein, the main body has a length and a width extending along an axial direction, the main body defines a main body plane along direction of the length and the width, and the at least one retaining rings are evenly distributed on the length; and wherein, the at least one retaining ring forms a fixed connection with the main body, including a base point, wherein the base point extends away from the main body plane to form an upper free end and a fixed end, wherein after extending a width distance in the direction of width, the fixed end continues to extend away from the upper free end to form a lower free end, wherein the width distance is not greater than a width of the main body; and wherein the base point extends above the main body plane to form the upper free end and the fixed end, wherein the fixed end extends a width distance in the direction of the width and then continues to extend below the main body plane to form a lower free end, the upper free end and the lower free end continue to extend and are joined away from the main body, so that the at least one retaining ring has a path for paper to turn over 360 degrees, wherein, a gap between the left flap and the right flap and a bottom of a housing thereby allowing the left flap and the right flap to have a movable space, so that the binder can turn the paper by 360 degrees.

15. The binder capable of turning paper by 360 degrees according to claim 14, wherein at least a part of the path has an arc trajectory, and a vertical height between the upper free end and the main body plane and a vertical height between the lower free end and the main body plane are not less than a distance between a paper edge and a paper perforation.

16. The binder capable of turning paper by 360 degrees according to claim 14, wherein the base point extends below the main body plane to form a lower free end and a fixed end, wherein the fixed end extends a width distance in the direction of the width and then continues to extend above the main body plane to form an upper free end.

17. The binder capable of turning paper by 360 degrees according to claim 16, wherein at least a part of the path has an arc trajectory, and a vertical height between the upper free end and the main body plane and a vertical height between the lower free end and the main body plane are both not less than a distance between a paper edge and a paper perforation.

* * * * *